United States Patent Office 3,227,741
Patented Jan. 4, 1966

3,227,741
PREPARATION OF ORGANIC CARBONATES
BEARING DISPARATE RADICALS
Donald M. Fenton, Anaheim, Calif., assignor to Union
Oil Company of California, Los Angeles, Calif., a corporation of California
No Drawing. Filed June 28, 1963, Ser. No. 291,303
7 Claims. (Cl. 260—463)

This invention relates to a method for the preparation of dialkyl carbonates having disparate alkyl groups, the preparation of alkyl aryl carbonates and the preparation of bis-alkyl carbonates of dihydroxyl compounds, said carbonates being useful for a variety of purposes such as solvents, plasticizers, oils, etc.

In my copending application Serial Number 260,844, filed February 25, 1963, there is disclosed a method for the preparation of dialkyl and poly(alkylcarbonates) by the reaction of carbon monoxide and an alcohol with a mercury salt. Unfortunately, this method is not directly applicable to the preparation of aromatic carbonates as mercuric ions are reactive with the phenolic nucleus, forming mercurated compounds.

Although my copending application also discloses that dialkyl carbonates of disparate radicals can be formed by performing the reaction in a mixed alcohol solvent, this approach does not preclude the formation of sym-dialkyl carbonates and thus requires an oft difficult product recovery step. Additionally, the yield of a product from the mixed alcohol solvent is controlled by kinetics, i.e., relative rates of reactions of the alcohols in the solvent. Consequently, very low yields of carbonates having unlike alkyl radicals are obtained when employing an alcohol of low reactivity with an alcohol of high reactivity since the major product is the dialkyl carbonate of the highly reactive alcohol.

Accordingly, it is an object of this invention to provide a method for the preparation of aromatic carbonates.

It is also an object of this invention to provide for the preparation of disparate alkyl carbonates in high yields.

Other and related objects will be apparent from the following description.

I have now found that the aforementioned objects can be achieved by a two-step preparation involving the formation of a carboalkoxymercuric salt in the first stage, recovery of the carboalkoxymercuric salt from the crude first stage product and subsequent reaction of the salt in a second stage to form the desired product.

As disclosed in my copending application, an alkanol readily reacts with carbon monoxide and a mercuric salt in an organic solvent. This reaction is continued until substantially complete saturation of carbon monoxide is achieved and a carboalkoxymercuric salt is formed. According to my present invention, the carboalkoxymercuric salt is isolated from the alkanol reaction solvent and thereafter reacted with an additional alkanol or aryl hydroxy compound to form the desired product. The resultant dialkyl carbonate or alkyl aryl carbonate can be readily recovered from the crude reaction product of the second stage and the remaining materials subjected to known oxidizing conditions to oxidize the mercury to the mercuric salt for recycling to the reactor.

The reaction is operated at relatively mild conditions, e.g., temperatures between about 0° and about 100° C. can be used in the first stage to form the carboalkoxymercuric salt and higher temperatures, e.g., between about 150° and about 350° C. can be used in the second stage to complete the reaction. While the presence of slight amounts of water can be tolerated in the reaction, the yields are decreased in its presence and therefore the reaction is preferably conducted under anhydrous conditions.

The aforementioned process secures the objectives of my invention in that aromatics are not mercurated by the carboalkoxymercuric salt that is used to contact the aromatic hydroxy compound in the second stage of the process. Additionally, high yields of mixed alkyl carbonates are achieved without the formation of sym-dialkyl carbonates since completion of the reaction and addition of the second alkyl group to the carbonate is performed only in the presence of an alkanol distinct from that used in the first stage.

The reactant alcohol employed in the first stage can be any desired primary alcohol corresponding to the particular alkyl group desired in the carbonate. Generally, alicyclic and aliphatic primary monohydroxy alkanols having from one to about 25 carbons can be employed to prepare the intermediate carboalkoxymercuric salt, e.g., methanol, ethanol, propanol, butanol, isobutanol, amyl alcohol, isoamyl alcohol, hexanol, isohexanol, heptanol, isoheptanol, 3-methylhexanol-1, lauryl alcohol, 3,4-diethylheptanol-1, 4-ethylhexanol, etc. Preferably, low molecular weight alcohols having 1 to about 12 carbons are used. The alkoxy radical of the carboalkoxy mercuric salt prepared corresponds to the alkyl group of the particular alcohol employed. Thus the use of methanol results in the production of carbomethoxymercuric salts, ethanol to carboethoxymercuric salts, propanol to carbopropoxymercuric salts, butanol to carbobutoxymercuric salts, etc.

The remainder of the reaction medium can be any organic solvent that is liquid at the reaction condition and is inert to the reactants, e.g., inert to mercuric salts, carbon monoxide, alcohols and/or to the intermediate salt. The particular alcohol employed as a reactant can be used in excess and thus comprise the reaction solvent. This is the preferred embodiment since it simplifies the product recovery steps. If desired, however, other organic solvents can be employed including various ethers such as: methyl ethyl ether, diethyl ether, diisopropyl ether, diisoamyl ether, ethyl benzyl ether, diethylene glycol diethyl ether, triethylene glycol diethyl ether, tetraethylene glycol dimethyl ether etc.

Various esters can also be employed as the solvent, e.g., methyl formate, ethyl formate, methyl acetate, ethyl acetate, n-propyl formate, isopropyl acetate, ethyl propionate, n-butyl formate, sec-butyl acetate, isobutyl acetate, ethyl n-butylate, n-butyl acetate, isoamyl acetate, n-amyl acetate, glycol diformate, furfural acetate, isoamyl n-butyrate, ethyl acetyl acetate, diethyl oxalate, glycol diacetate, isomyl isovalerate, methyl benzoate, ethyl benzoate, methyl salicylate, n-propyl benzoate, n-dibutyl oxalate, etc.

The saturated or aromatic hydrocarbons can of course be used as suitable inert solvents, e.g., pentane, hexane, heptane, octane, decane, dodecane, benzene, toluene, xylene, kerosene, naphtha, etc.

The mercuric salts that can be employed are those soluble in the reaction medium. Included in such salts are the mercuric halides and carboxylates of the lower molecular weight carboxylic acids, e.g., mercuric chloride, mercuric bromide, mercuric nitrate, mercuric acetate, mercuric propionate, mercuric butyrate, mercuric pentonate, etc. Of these, mercuric carboxylates are preferred and mercuric acetate is most preferred.

The first stage of the reaction results in the formation of the carboalkoxymercuric salt as shown by the following:

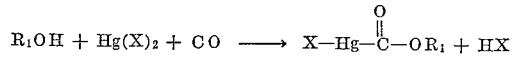

$$R_1OH + Hg(X)_2 + CO \longrightarrow X-Hg-\overset{O}{\overset{\|}{C}}-OR_1 + HX$$

wherein X represents the particular anion of the mercuric salt, e.g., the aforementioned halide or carboxylate groups.

In the first stage of the reaction, the solution is treated to saturation with carbon monoxide and alcoholic or organic solution of the resultant carboalkoxymercuric salt is isolated from the reaction medium. Suitable isolation steps include the crystallization and separation of the solid mercuric salt by conventional solid-liquid separation methods, e.g., filtration, centrifugation, etc. If desired, the crystallization can be improved by chilling the reaction medium and/or concentrating the reaction medium by a preliminary evaporation of a substantial quantity of the reaction solvent. Alternatively, of desired, the carboalokxymercuric salt can be extracted from the reaction medium by suitable extraction methods with a selective solvent.

Generally, temperatures between about 0° and about 100° C. can be used in the first step to complete the absorption of carbon monoxide; preferably, temperatures from about 25° to about 75° C. are used. High pressures are preferred to favor absorption of carbon monoxide, generally pressures from about 10 to about 2000 p.s.i.g. can be used; preferably between about 100 and about 500 p.s.i.g. are used.

The length of the primary carbon monoxide absorption stage depends on the degree of contacting between the liquid and gas. The necessary length of time is readily determinable by observing when carbon monoxide is no longer absorbed as reflected by achieving a steady reaction pressure or any other indication that a portion of the gas phase is no longer being absorbed.

Thereafter, the reaction zone is depressured and the aforementioned isolation steps performed to separate the carboalkoxymercuric salt as the intermediate.

The carboalkoxymercuric salt is then added to a fresh solvent and decomposed by more severe conditions in the presence of a primary alcohol or aryl hydroxy compound to produce the desired alkyl aryl or mixed alkyl carbonate, in accordance with the following reaction:

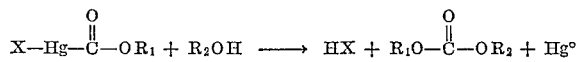

wherein $R_2OH$ represents any of the aforementioned primary alcohols that are unlike the primary alcohol employed in the first reaction step, a polyhydric alkanol or wherein $R_2OH$ represents a suitable aryl hydroxy or polyhydroxy compound. Because the carboalkoxymercuric salt is decomposed in the absence of the primary alcohol employed in its formation, it is apparent that sym-dialkyl carbonates can not be formed, but rather high yields of dialkyl carbonates having unlike alkyl radicals can be achieved. Additionally, the mercuration of the aryl nucleus of aromatic hydroxy compounds is avoided as mercuric ions are not present to react with the aryl nucleus. Consequently, high yields of alkali aryl carbonates can be achieved by this method.

Various aryl hydroxy compounds that can be used as the reactant in the second stage of the method to prepare the alkyl aryl carbonates can be any of the following: phenol; various positional isomers of alkyl phenols, i.e., meta-, para- and ortho-cresols, ethylphenols, propylphenols, isopropylphenols, butylphenols, isoamylphenols, etc.; the 2,3-; 2,4-; and 3,5-xylenol positional isomers, naphthol, 1-methylnaphthol, 2-methylnaphthol, etc.

It is of course apparent that when polyhydric alcohols or polyphydroxy aromatics are used, bisalkyl carbonates can be obtained. To illustrate, bismethylcarbonate of ethylene glycol can be obtained by reaction of the carbomethoxymercuric salt with ethylene glycol. In a similar fashion, bis-propylcarbonate of propylene glycol, bis-methylcarbonate of 4,4'-isopropylidene-diphenol, bis-ethylcarbonate of hydroquinone, bis-amylcarbonate of resorcinol, etc. can be prepared.

The second stage of the reaction can be conducted in an excess of the aryl hydroxy compounds and this excess can comprise the entire reaction medium. If desired, however, any of the aforementioned solvents can also be employed in the second stage of the reaction. The reactants are heated to a temperature generally between about 150° and about 350° C. for the second stage of the reaction. Preferably, temperatures between about 175° and about 225° C. are used. A sufficient time is provided, between about 10 and about 300 minutes; preferably between about 30 and 180 minutes; is provided to complete the decomposition of the carboalkoxymercuric salt and the formation of the desired alkyl or aryl carbonate.

The crude reaction produce can be readily decanted to separate the organic products from the mercury and the former are treated to recover the product of the reaction, i.e., the mixed dialkyl carbonate or the alkyl aryl carbonate in any conventional manner. Generally, the carbonates are crystalline solids and can readily be separated from the reaction medium by filtration. The separation can be enhanced by chilling the reaction medium and/or concentrating the reaction medium by evaporation of the reaction solvent and the carboxylic acid when mercuric carboxylates are employed.

The mercury separated from the crude reaction product can thereafter be subjected to oxidizing conditions to oxidize the mercry to its soluble salt for recycling to the reaction. Preferably, the carboxylic acid recovered in the product recovery step is recombined with the mercury for this oxidation and recycling period. Various known oxidizing conditions can be employed in this step, e.g., nitric acid, chromic acid, permanganates, ozone, etc. can be employed with or without oxygen under a temperature between about 0° C. and about 250° C. to re-oxidize the mercury to the mercuric salt suitable for recycling.

The following examples will serve to illustrate the mode of practicing my invention:

Example 1

Carbomethoxymercuric acetate was prepared by the addition of 100 milliliters of methanol, 32 grams mercuric acetate and 21 milliliters toluene to a 300 milliliter bomb that was thereafter pressured to 400 p.s.i.g. with carbon monoxide. The bomb was heated and held at 50° C. for 1 hour. Thereafter, the bomb was cooled, opened and the carbomethoxymercuric acetate separated therefrom as a white crystalline solid that was recovered by filtration. The white crystalline solid was added to 4,4'-isopropylidenediphenol in equal molar quantities along with 50 milliliters of diethyl ether as solvent and the mixture was placed in the bomb and heated under a carbon monoxide pressure of 400 p.s.i.g. to 220° C. and held at that temperature for 3 hours. After the 3-hour period, the bomb was cooled, opened and the contents filtered to recover the organic portion free of the metallic mercury. The filtrate was concentrated on a steam bath to give a viscous, semi-solid material identified by subsequent analysis as bis-methyl carbonate of 4,4'-isopropylidenediphenol. This material was insoluble in water.

When the reaction is attempted by the direct reaction of mercuric acetate with phenol and methanol in a titanium bomb, dimethyl carbonate is the only carbonate formed.

Example 2

Carbobutoxymercuric acetate was prepared by reacting carbon monoxide and mercuric acetate in an excess of n-butanol at 50° C. The product is recovered by evaporation of the excess butanol at reduced pressure and room temperature. The carbobutoxy mercuric acetate is placed in a titanium bomb with excess methanol and the bomb is closed and pressured with carbon monoxide to 400 p.s.i.g. The bomb is heated to 220° C. and held at this temperature for 3 hours. After the 3-hour period, the mixture is filtered to recover an organic filtrate from the metallic mercury. The filtrate was purified to recover methyl butyl carbonate in a high yield, as indicated by gas liquid chromatography and infrared spectrum.

*Example 3*

Carbobutoxymercuric acetate and phenol are placed in a flask and heated until the temperature reached 70° C. when the light colored solution was observed to turn gray. Metallic mercury formed and the mixture was finally heated to 230° C. After a 1-hour heating period, the mixture was cooled and filtered to recover a light brown filtrate from which butyl phenyl carbonate was obtained.

The preceding examples are intended solely to illustrate my invention and are not to be construed as unduly limiting thereof. My invention is intended to be defined by the method steps and their equivalents set forth in the following claims.

I claim:
1. The manufacture of a bis-alkylcarbonate of a dihydroxyl compound selected from the class consisting of dihydroxy monocyclic and bicyclic aryl compounds and dihydric alkanols that comprises absorbing carbon monoxide in a reaction medium comprising a solution containing a mercuric carboxylate of a lower molecular weight alkyl carboxylic acid and a primary alkanol at a temperature between about 0° and about 100° centigrade and a pressure between about 10 and about 2000 p.s.i.g. to thereby from a carboalkoxymercuric salt, separating said carboalkoxymercuric salt from the crude product of said absorption and thereafter heating said carboalkoxymercuric salt in the presence of said dihydroxyl compound at a temperature between about 150° and about 350° centigrade to decompose said carboalkoxymercuric salt and form said bis-alkylcarbonate of said dihydroxyl compound.

2. The manufacture of claim 1 wherein said dihydroxyl compound is a dihydric alkanol.

3. The manufacture of claim 1 wherein said dihydroxyl monocyclic compound is a dihydroxy aryl compound.

4. The manufacture of a dialkyl carbonate having unlike alkyl radicals that comprises absorbing carbon monoxide in a reaction medium comprising a solution containing a mercuric carboxylate of a lower molecular weight alkyl carboxylic acid and a primary monohydroxy alkanol at a temperature between about 0° and about 100° centrigrade and a pressure between about 10 and about 2000 p.s.i.g. to form a carboalkoxymercuric salt, separating said carboalkoxymercuric salt from said solution and thereafter heating said carboalkoxymercuric salt in the presence of a second primary monohydroxy alkanol different from said first alkanol at a temperature between about 150° and about 350° centigrade to form said dialkyl carbonate having an alkyl radical derived from said first primary alkanol and a second alkyl radical derived from said second primary alkanol.

5. The manufacture of claim 4 wherein in said first and second primary monohydroxy alkanols have 1 to about 12 carbon atoms per mole.

6. The manufacture of an alkyl aryl carbonate that comprises absorbing carbon monoxide in a reaction medium comprising a solution containing a mercuric carboxylate of a lower molecular weight alkyl carboxylic acid and a primary monohydroxy alkanol at a temperature between about 0° and about 100° centigrade and a pressure between about 10 and about 2000 p.s.i.g. to thereby form a carboalkoxymercuric salt, separating said carboalkoxymercuric salt from the crude product of said absorption and thereafter heating said carboalkoxymercuric salt in the presence of an aryl hydroxy compound selected from the class consisting of monocyclic and bicyclic aryl monohydroxy compounds at a temperature between about 150° and about 350° centigrade to decompose said carboalkoxymercuric salt and form said alkyl aryl carbonate.

7. The manufacture according to claim 6 wherein said aryl hydroxy compound is phenol.

References Cited by the Examiner
UNITED STATES PATENTS

| | | | |
|---|---|---|---|
| 1,603,689 | 10/1926 | Hammond | 260—463 |
| 2,370,567 | 2/1945 | Muskat et al. | 260—463 |
| 2,791,601 | 5/1957 | Unger et al. | 260—463 |
| 3,114,762 | 12/1963 | Mador et al. | 260—463 |

OTHER REFERENCES

Nerdel: Naturwissenschaften, vol. 39, pp. 209–210 (1952).

CHARLES B. PARKER, *Primary Examiner.*